(12) United States Patent
Pauli et al.

(10) Patent No.: US 7,324,600 B2
(45) Date of Patent: Jan. 29, 2008

(54) CHANNEL ESTIMATION IN A MULTI CARRIER TRANSMIT DIVERSITY SYSTEM

(75) Inventors: Mathias Pauli, Nürnberg (DE); Udo Wachsmann, Schwabach (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 679 days.

(21) Appl. No.: 10/774,702

(22) Filed: Feb. 10, 2004

(65) Prior Publication Data

US 2004/0190639 A1  Sep. 30, 2004

Related U.S. Application Data

(63) Continuation of application No. PCT/EP02/08211, filed on Jul. 23, 2002.

(30) Foreign Application Priority Data

Aug. 10, 2001 (EP) ................................ 01119371

(51) Int. Cl.
*H04L 27/28* (2006.01)
(52) U.S. Cl. ........................................... 375/260
(58) Field of Classification Search ................ 375/148,
375/260, 267, 285, 343, 346–348, 355; 370/208,
370/503, 509, 514; 455/67.11
See application file for complete search history.

(56) References Cited

U.S. PATENT DOCUMENTS

| | | | | |
|---|---|---|---|---|
| 5,539,730 A | * | 7/1996 | Dent | ........................... 370/280 |
| 6,088,408 A | | 7/2000 | Calderbank et al. | |
| 6,389,087 B1 | * | 5/2002 | Heinonen et al. | ........... 375/354 |
| 6,891,897 B1 | * | 5/2005 | Bevan et al. | ................ 375/265 |
| 6,983,127 B1 | * | 1/2006 | Da Torre et al. | ......... 455/67.11 |
| 7,009,932 B2 | * | 3/2006 | Matheus et al. | ............ 370/208 |
| 7,027,530 B2 | * | 4/2006 | McFarland et al. | ......... 375/341 |
| 7,031,419 B2 | * | 4/2006 | Piirainen | .................... 375/358 |

FOREIGN PATENT DOCUMENTS

| | | |
|---|---|---|
| EP | 0 453 203 | 10/1991 |
| WO | WO 98/19410 | 5/1998 |
| WO | WO 01/56239 | 8/2001 |

OTHER PUBLICATIONS

Lee et al, "A space-frequency transmitter diversity technique for OFDM systems", Proceedings of IEEE Global Telecommunications Conference, vol. 3 of 3, Nov. 27, 2000-Dec. 1, 2000, pp. 1474-1475.
Li et al, "Transmitter Diversity for OFDM Systems and Its Impact on High-Rate Data Wireless Networks", IEEE Journal on Selected Areas in Communications, IEEE Inc., vol. 17, No. 7, Jul. 1999, pp. 1233-1243.

* cited by examiner

*Primary Examiner*—Khanh C. Tran
(74) *Attorney, Agent, or Firm*—Nixon & Vanderhye P.C.

(57) ABSTRACT

A method and a stage for estimating channel coefficients in a multi carrier system operating in accordance with a block-code based transmit diversity scheme, in which a data content of a code matrix is multiplexed in a frequency domain are described. The method comprises determining a phase ramp in the frequency domain or an equivalent thereof in the time domain, the phase ramp or the equivalent thereof being comprised within a receive signal after timing synchronization, processing the receive signal to remove the phase ramp or the equivalent thereof and estimating the channel coefficients on the basis of the processed receive signal.

22 Claims, 7 Drawing Sheets

| modulation scheme | code rate | bit rate |
|---|---|---|
| BPSK | 1/2 | 6 Mbps |
| BPSK | 3/4 | 9 Mbps |
| QPSK | 1/2 | 12 Mbps |
| QPSK | 3/4 | 18 Mbps |
| 16-QAM | 9/16 | 27 Mbps |
| 16-QAM | 3/4 | 36 Mbps |
| 64-QAM | 3/4 | 54 Mbps |

CHANNEL ESTIMATION IN A MULTI CARRIER TRANSMIT DIVERSITY SYSTEM

This application is a continuation of Application No. PCT/EP02/08211 filed Jul. 23, 2002, which designated the U.S. and claims the benefit of EP 0111937.1 filed Aug. 10, 2001, the entire contents of which are hereby incorporated by reference.

TECHNICAL FIELD

The present invention relates to the field of transmit antenna diversity and provide to a method of estimating channel coefficients in a multi carrier transmit diversity system.

BACKGROUND

Peak transmission rates in wireless communication systems have steadily increased during the last years. However, peak transmission rates are still limited for example due to path loss, limited spectrum availability and fading.

Transmitter diversity is a highly effective technique for combating fading in wireless communications systems. Several different transmit diversity schemes have been proposed. In Li, Y.; Chuang, J. C.; Sollenberger, N. R.: Transmitter diversity for OFDM systems and its impact on high-rate data wireless networks, IEEE Journal on Selec. Areas, Vol. 17, No. 7, July 1999 the transmit diversity schemes of delay, permutation and space-time coding are exemplarily described. According to the delay approach, a signal is transmitted from a first transmitter antenna and signals transmitted from further transmitter antennas are delayed versions of the signal transmitted from the first transmitter antenna. In the permutation scheme, the modulated signal is transmitted from a first transmitter antenna and permutations of the modulated signal are transmitted from further transmitter antennas. Thus, the signal transmitted from the transmitter antennas can be derived from a matrix composed of data words in the form of the modulated signal and of permutations of the modulated signal. By means of space-time coding a signal is encoded into several data words and each data word is transmitted from a different transmitter antenna. During transmission the data words are spread (i.e., multiplexed) in the time domain by successively transmitting the data symbols of each data word over a single carrier frequency.

Another transmit diversity scheme is described in U.S. Pat. No. 6,088,408. According to this transmit diversity scheme data are coded in the form of matrices and transmitted as individual data blocks. Each data block comprises several data words and each data word contains data symbols derived from an input data signal. During transmission of the data blocks, the individual data words are spread in the time domain. Therefore, the transmit diversity scheme described in U.S. Pat. No. 6,088,408 can be referred to as space-time block coding (STBC). The main features of STBC are that each data symbol is transmitted from each transmit antenna and that the antenna signals of different transmit antennas are orthogonal to each other. Orthogonal STBC data blocks can be designed for an arbitrary number of transmit antennas.

A further transmit diversity scheme for a multi carrier system is space-frequency block coding (SFBC). By means of space-frequency block coding a signal is encoded into individual data blocks comprising several data words and each data word is spread (i.e., multiplexed) in the frequency domain by transmitting the data symbols of each data word on orthogonal frequencies, i.e. orthogonal subcarriers. An exemplary scheme for space-frequency block coding is described in Lee K. F. et al: "A space-frequency transmitter diversity technique for OFDM systems", Globecom '00- IEEE. Global Telecommunications Conference. Conference record (Cat. No. 00 CH37137), Proceedings of global Telecommunications conference, San Francisco, Calif, USA, 27 Nov. -1 Dec. 2000, pages 1473-1477 vol. 3.

An important feature on a receiving side of a multi carrier transmit diversity system is a characterization of the individual transmit channels which enables an efficient demodulation of the receive signal. Consequently, a channel estimation has to be performed as described in Li, Y.; Chuang, J. C.; Sollenberger, N. R.: Transmitter diversity for OFDM systems and its impact on high-rate data wireless networks, IEEE Journal on Selec. Areas, Vol. 17, No. 7, July 1999 and in U.S. Pat. No. 6,088,408.

Departing from the various channel estimation approaches known in the art there is a need for a more accurate method of estimating channel coefficients in a multi carrier system operating in accordance with a code matrix based transmit diversity scheme in which a data content of the code matrix is multiplexed in the frequency domain. There is also a need for an estimating stage for performing the corresponding estimating method and for a transceiver comprising such an estimating stage.

SUMMARY

The existing need is satisfied by a method of estimating channel coefficients in a multi carrier system operating in accordance with a block-code based transmit diversity scheme in which a data content, e.g. data words, of a code matrix is multiplexed in a frequency domain, comprising determining a phase ramp in the frequency domain or an equivalent thereof in the time domain, the phase ramp or the equivalent thereof being comprised within a receive signal after timing synchronization, processing the receive signal to remove the phase ramp or the equivalent thereof, and estimating the channel coefficients on the basis of the processed receive signal. The phase ramp may be introduced by the transmit channel, by a receive or transmit filter, or during timing synchronization.

The channel estimation method of the invention is not restricted to a specific block-coding scheme as long as the utilized transmit diversity scheme enables to generate from a data signal code matrices which can be multiplexed in the frequency domain. The code matrices preferably have the form of data blocks comprising data words, wherein each data word contains data symbols derived from the data signal. For example, the transmit diversity schemes of SFBC and of permutation in the frequency domain allow to generate such code matrices.

According to the invention it is not necessary that the employed transmit diversity scheme uses pure frequency domain multiplexing. For example, a transmit diversity scheme which uses STBC and SFBC in an alternating manner, i.e. which alternatingly multiplexes in the time domain and in the frequency domain, may also be used. In such a case the inventive method of estimating channel coefficients may be activated each time the system switches from STBC to SFBC and de-activated each time the system switches from SFBC to STBC.

The channel estimation method according to the invention does not require that the transmit diversity scheme guarantees full transmit diversity and orthogonality. In other words, the invention does not necessitate that each data symbol comprised within a data signal is transmitted on a different frequency. Nonetheless, a preferred embodiment of the invention comprises the feature of full transmit diversity and orthogonality.

Moreover, the invention is not restricted to any number of transmit and receive antennas. Preferably, the code matrix is chosen such that the number of data words per data block equals the number of transmit antennas. If more than one receive antenna is provided, the receive diversity scheme of maximum-ratio combining can be applied. However, other receive diversity schemes may be used as well.

Various alternatives for determining the phase ramp in the frequency domain or the equivalent thereof in the time domain exist. For example, the phase ramp or the equivalent thereof can be determined by way of estimation. Estimates for the phase ramp or the equivalent thereof are preferably derived by linear regression. Instead of or in addition to an estimation of the phase ramp or of the equivalent thereof, calculation or measurement approaches may be used.

Timing synchronization, which might be one of several reasons for the phase ramp comprised within the receive signal, can be performed in many ways. Possibly, timing synchronization is performed such that intersymbol interference is minimized. Thus, the timing instant which is optimum with respect to minimum interference power can be chosen for system timing purposes.

Determining the phase ramp or the equivalent thereof and removing the determined phase ramp or the equivalent thereof from the receive signal can be performed either in the frequency domain or in the time domain. It is also possible to perform one of these two steps in the frequency domain and the other step in the time domain. In the time domain, the equivalent of the phase ramp will be a delay. This delay can be determined and removed from the receive signal prior to an estimation of the channel coefficients.

Removal of the phase ramp or the equivalent thereof may be performed at various locations and at different points in time. For example, when after timing synchronization the receive signal is split and fed into a channel estimation branch on the one hand and a demodulation branch on the other hand, removal of the phase ramp or the equivalent thereof may be effected either in the channel estimation branch or prior to splitting of the receive signal.

It has been pointed out above that the channel coefficients are estimated using a processed receive signal including no or at least a reduced phase ramp. However, once the channel coefficients have been estimated, the phase ramp or the equivalent thereof, which has previously been determined, may be introduced into the estimated channel coefficients again. Such an introduction of the phase ramp or the equivalent thereof into the estimated channel coefficients is advantageous if the receive signal, which is to be demodulated using the estimated channel coefficients, also comprises the phase ramp or the equivalent thereof. This might be the case for example when the phase ramp removal is performed in the channel estimation branch.

The above method can be implemented both as a computer program product comprising program code portions for performing the method and as a hardware solution. The hardware solution is constituted by an appropriately configured estimating stage for estimating channel coefficients in a multi carrier transmit diversity system operating in accordance with a block-coding scheme. The estimating stage has a unit for determining a phase ramp in the frequency domain or an equivalent thereof in the time domain comprised within a receive signal after timing synchronization, a unit for processing the receive signal to remove the phase ramp or the equivalent thereof, and a unit for estimating the channel coefficients using the processed receive signal.

In a signal path behind a timing synchronization unit a node might be arranged for splitting a common signal path into a channel estimation branch and a demodulation branch. The processing unit may be arranged either in the channel estimation branch or in the common signal path prior to the node. Preferably, the estimating stage further comprises a unit for introducing the phase ramp or the equivalent thereof into the estimated channel coefficients.

Many transmit diversity schemes require constant or at least approximately constant channel parameters, i.e. channel phase and channel amplitude in the frequency domain, during transmission of one data word. Since the data words are to be multiplexed in the frequency domain, a comparatively large coherence band width is required. This means that the relation $$Bc >> N/T \qquad (1)$$

has to be fulfilled at least approximately, wherein $B_c \approx 1/\tau_{rms}$ is the channel cherence bandwidth, N is the number of data symbols per data word, T is the duration of one of the data symbols, i.e. the duration of one time slot, and $\tau_{rms}$ is the root mean square of the delay spread of the channel impulse response. A comparatively large coherence bandwidth requires that the channel coefficients of N adjacent subcarriers have to be almost constant.

The data signal from which the one or more code matrices, i.e. data blocks, are generated can have any format. According to a preferred embodiment, the data signal has the format of a sequence of discrete information symbols. For example, the data signal may have the structure of vectors, each vector comprising a predefined number of information symbols. The nature of the information symbols may depend on the specific wireless communication system in which the multiplexing method according to the invention is used. Many wireless communication systems employ different types of information symbols for different purposes. For example, some wireless communication systems use data signals which comprise a preamble, one or more user data sections or both a preamble and one or more user data sections. Usually, the preamble has a predefined structure and enhances functions like channel estimation, frequency synchronization and timing synchronization.

The code matrix may be derived from the data signal in various ways dependent on the transmit diversity scheme which is actually used. If, for example, the transmit diversity scheme of permutation is used, the data symbols contained in the data words of the code matrix are permutations of information symbols comprised within the original data signal. As a further example, if the transmit diversity scheme of SFBC is used, the data symbols contained in the data words of the code matrix are obtained from the information symbols comprised within the original data signal by means of permutation and basic arithmetic operations, such as negation and complex conjugation.

DETAILED DESCRIPTION

Although the present invention can be used in any multi carrier transmit diversity system which employs a transmit diversity scheme allowing to generate data blocks having a structure similar to e.g. a SFBC code matrix and to perform multiplexing in the frequency domain, the following description of preferred embodiments is exemplarily set forth with respect to a multi carrier system which employs orthogonal frequency division multiplexing (OFDM) and which alternately utilizes STBC and SFBC for generating data blocks from a data signal and for multiplexing the generated data blocks.

The exemplary multi carrier system is derived from the European wireless local area network (WLAN) standard HIgh PErformance Radio Local Area Network type 2 (HIPERLAN/2). HIPERLAN/2 systems are intended to be operated in the 5 GHz frequency band. Up to now, the HIPERLAN/2 system and many other wireless communications systems do not support transmit diversity in spite of the fact that transmit diversity would improve the transmission performance and reduce negative effects of fast fading like Rayleigh fading. A system overview of HIPERLAN/2 is given in ETSI TR 101 683, Broadband Radio Access Networks (BRAN); HIPERLAN Type 2; System Overview, V1.1.1 (2000-02) and the physical layer of HIPERLAN/2 is described in ETSI TS 101 475; Broadband Radio Access networks (BRAN); HIPERLAN Type 2; Physical (PHY) Layer, V1.1.1 (2000-04). The multi carrier scheme of OFDM, which is specified in the HIPERLAN/2 standard, is very robust in frequency selective environments.

Figure 1:
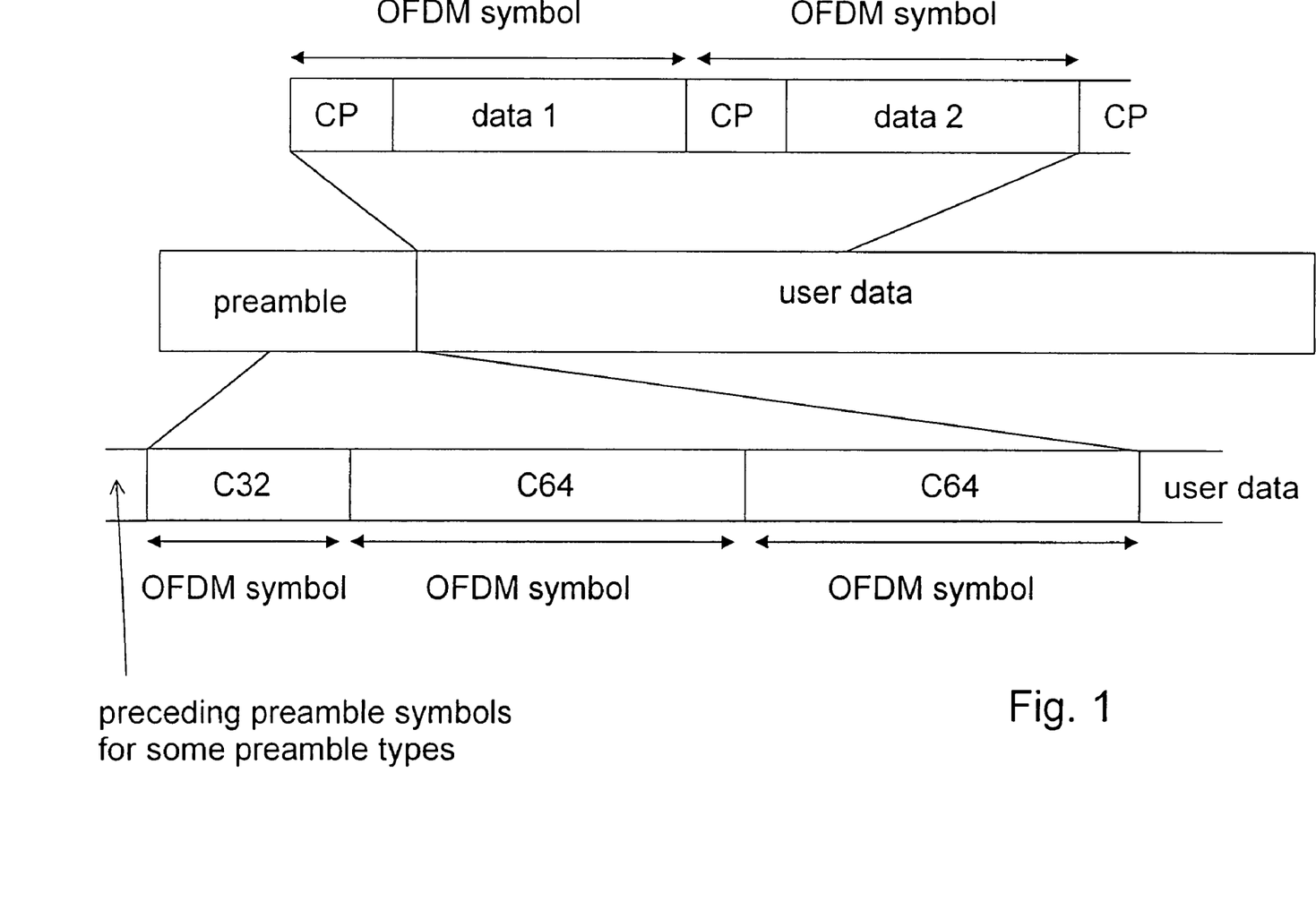
FIG. 1 shows a data signal in the form of a physical burst to be processed in accordance with the invention.

In FIG. 1 a typical physical burst of HIPERLAN/2 is illustrated. The physical burst comprises a preamble consisting of preamble symbols and a user data section consisting of user data symbols. In HIPERLAN/2 five different physical bursts are specified. Three of the physical bursts have a different preamble each and the two remaining bursts have a further preamble in common. The last three preamble symbols constitute a periodic structure which is identical for all preamble types. This periodic structure consists of a short OFDM symbol C32 of 32 samples followed by two identical regular OFDM symbols C64 of 64 samples. The short OFDM symbol C32 is a cyclic prefix which is a repetition of the second half of one of the C64 OFDM symbols. The so-called C-preamble depicted in FIG. 1 is used in HIPERLAN/2 for channel estimation, frequency synchronization and timing synchronization. The periodic structure within the C-preamble is necessary in order to allow the use of synchronization algorithms with comparatively low complexity.

Figure 2:
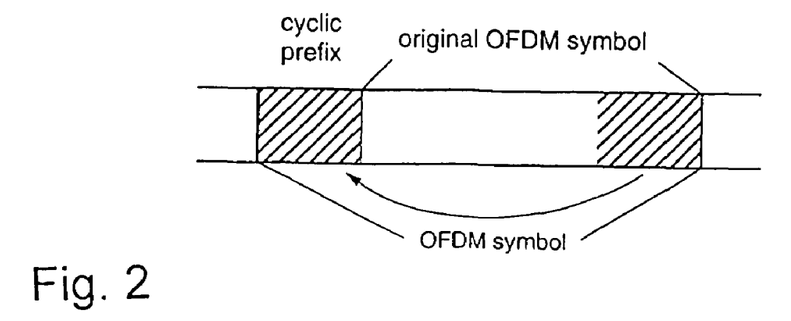
FIG. 2 shows the structure of an OFDM symbol comprising a cyclic prefix.

The user data section of the physical burst depicted in FIG. 1 comprises a variable number $N_{SYM}$ of OFDM symbols required to transmit a specific protocol data unit (PDU) train. Each OFDM symbol of the user data section consists of a cyclic prefix and a useful data part. The cyclic prefix consists of a cyclic continuation of the useful data part and is inserted before it. Thus, the cyclic prefix is a copy of the last samples of the useful data part as depicted in FIG. 2.

The length of the useful data part of the physical burst shown in FIG. 1 is equal to 64 samples and has a duration of 3,2 μs. The cyclic prefix has a length of either 16 (mandatory) or 8 (optional) samples and a duration of 0,8 μs or 0,4 μs, respectively. Altogether, a OFDM symbols has a length of either 80 or 72 samples corresponding to a symbol duration of 4,0 μs or 3,6 μs, respectively. An OFDM symbol therefore has an extension in the time domain. A OFDM symbol further has an extension in the frequency domain. According to HIPERLAN/2, a OFDM symbol extends over 52 subcarriers. 48 subcarriers are reserved for complex valued subcarrier modulation symbols and 4 subcarriers are reserved for pilots.

Figure 3:
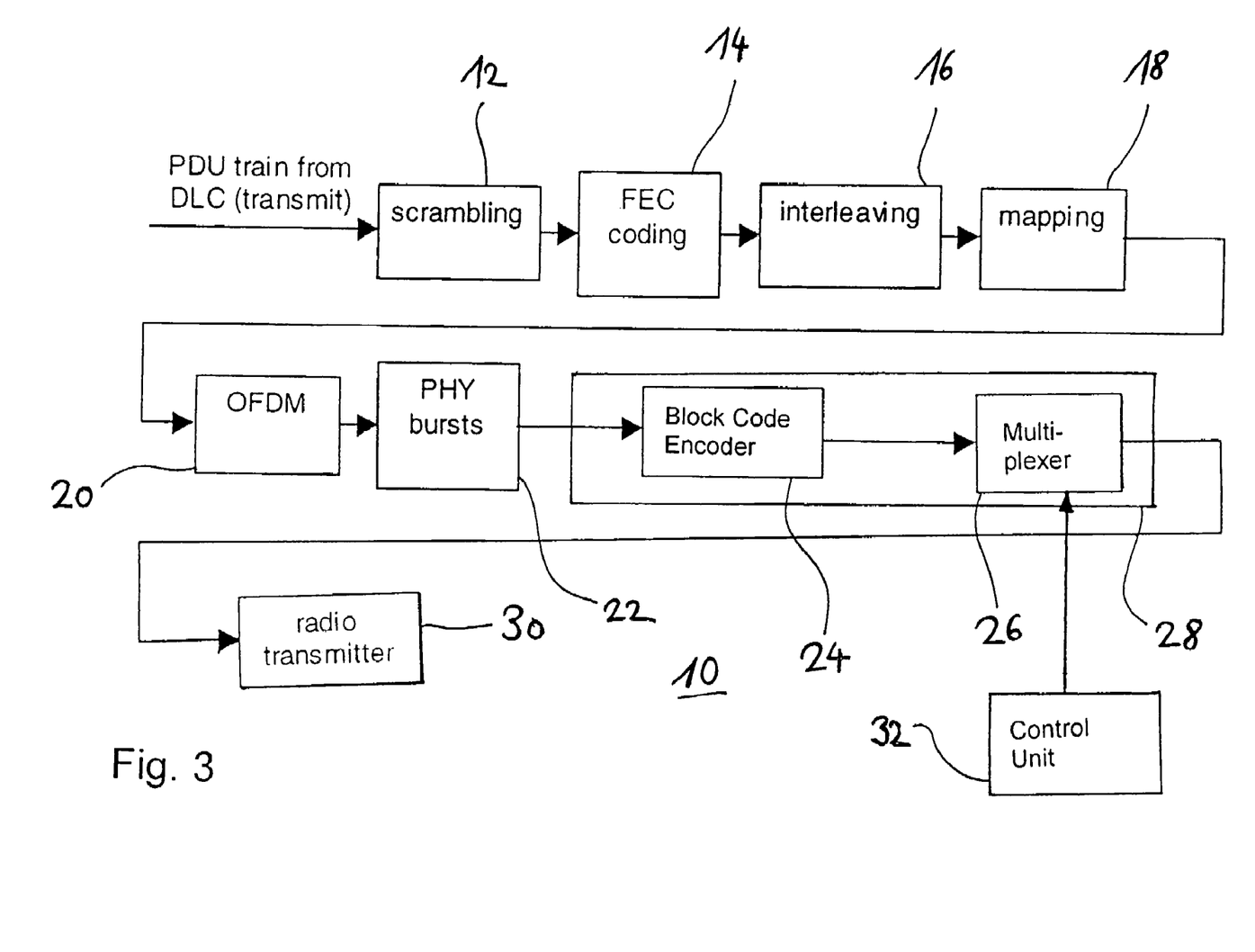
FIG. 3 is a block diagram of a transmitter stage of a transceiver for wireless communication.

In FIG. 3, the physical layer of a transmitter stage 10 of a transceiver for wireless communication is illustrated. The transmitter stage 10 comprises a scramble 12, an FEC coding unit 14, an interleaving unit 16, a mapping unit 18, an OFDM unit 20, a burst forming unit 22, a block code encoder 24, a multiplexer 26, a radio transmitter 30 and a control unit 32. The block code encoder 24 and the multiplexer 26 together form an encoder/multiplexer unit 28.

The transmitter stage 10 depicted in FIG. 1 receives as input signal a PDU train from a data link control (DLC). Each PDU train consists of information bits which are to be framed into a physical burst, i.e. a sequence of OFDM symbols to be encoded, multiplexed and transmitted.

Figure 4:
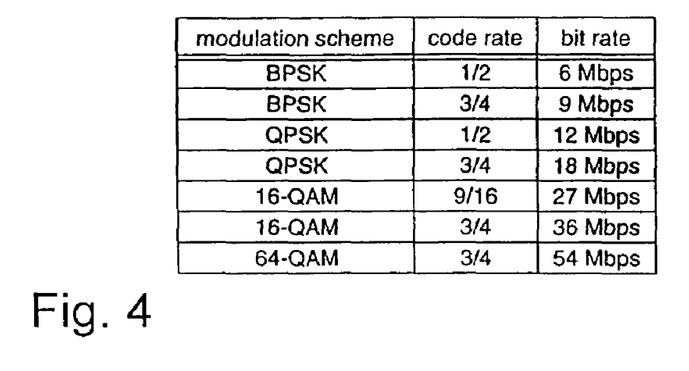
FIG. 4 shows several modulation schemes defined in the HIPERLAN/2 standard.

Upon receipt of a PDU train the transmission bit rate within the transceiver is configured by choosing an appropriate physical mode based on a link adaption mechanism. A physical mode is characterized by a specific modulation scheme and a specific code rate. In the HIPERLAN/2 standard several different coherent modulation schemes like BPSK, QPSK, 16-QAM and optional 64-QAM are specified. Also, for forward error control, convolutional codes with code rates of ½, 9⁄16 and ¾ are specified which are obtained by puncturing of a convolutional mother code of rate ½. The possible resulting physical modes are depicted in FIG. 4. The data rate ranging from 6 to 54 Mbit/s can be varied by using various signal alphabets for modulating the OFDM subcarriers and by applying different puncturing patterns to a mother convolutional code.

Once an appropriate physical mode has been chosen, the $N_{BPDU}$ information bits contained within the PDU train are scrambled with the length-127 scrambler 12. The scrambled bits are then output to the FEC coding unit 14 which encodes the $N_{BPDU}$ scrambled PDU bits according to the previously set forward error correction.

The encoded bits output by the FEC coding unit 14 are input into the interleaving unit 16 which interleaves the encoded bits by using the appropriate interleaving scheme for the selected physical mode. The interleaved bits are input into the mapping unit 18 where sub-carrier modulation is performed by mapping the interleaved bits into modulation constellation points in accordance with the chosen physical mode. As mentioned above, the OFDM subcarriers are modulated by using BPSK, QPSK, 16-QAM or 64-QAM modulation depending on the physical mode selected for data transmission.

The mapping unit 18 outputs a stream of complex valued subcarrier modulation symbols which are divided in the OFDM unit in groups of 48 complex numbers. In the OFDM unit a complex base band signal is produced by OFDM modulation as described in ETSI TS 101 475, Broadband Radio Access Networks (BRAN); HIPERLAN Type 2; Physical (PHY) Layer, V1.1.1 (2000-04).

The complex base band OFDM symbols generated within the OFDM unit 20, where pilot subcarriers are inserted, are input into the physical burst unit 22, where an appropriate preamble is appended to the PDU train and the physical burst is built. The physical burst produced by the physical burst unit 22 has a format as depicted in FIG. 1. The physical burst unit 22 thus outputs a sequence of complex base band OFDM symbols in the form of the physical burst to the block code encoder 24.

Figure 5:
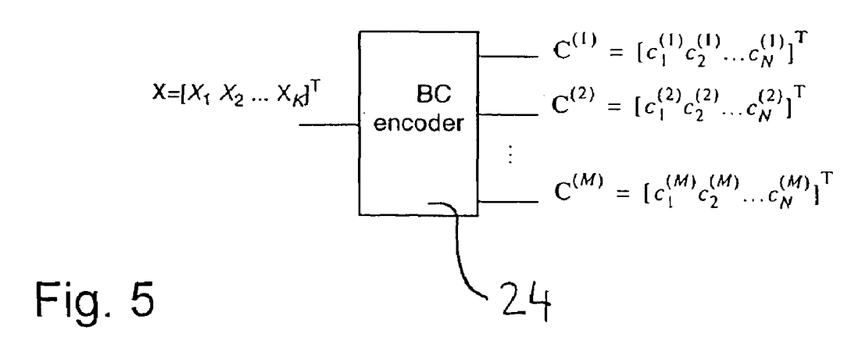
FIG. 5 shows a block code encoder of the transceiver depicted in FIG. 3.

The function of the block code encoder 24 is now generally described with reference to FIG. 5. In general, the block code encoder 24 receives an input signal in the form of a sequence of vectors $X=[X_1 X_2 \ldots X_K]^T$ of the length K. The block code encoder 24 encodes each vector X and outputs for each vector X a data block comprising a plurality of signal vectors $C^{(1)}, C^{(2)}, \ldots, C^{(M)}$ as depicted in FIG. 5. Each signal vector $C^{(1)}, C^{(2)}, \ldots, C^{(M)}$ corresponds to a single data word. Thus, the data block generated from the vector X comprises M data words, wherein M is the number of transmitter antennas.

Each data word $C^{(i)}$ with i=1 ... M comprises N data symbols, i.e. each data word $C^{(i)}$ has a length of N. The value of N cannot be freely chosen since a code matrix C spanned by the data words $C^{(i)}$ has to be orthogonal in this embodiment. Several examples for data blocks in the form of orthogonal code matrices C are described in U.S. Pat. No. 6,088,408, herewith incorporated by reference. In the block coding approach described in the present embodiment, all data symbols $c_j^i$ of the code matrix C are derived from the components of the input vector X and are simple linear functions thereof or of its complex conjugate.

If a receive signal vector Y at one receive antenna is denoted by $Y=[Y_1 Y_2 \ldots Y_N]^T$, the relationship between Y and the code matrix C is as follows:

$$\begin{bmatrix} Y_1 \\ Y_2 \\ \ldots \\ Y_N \end{bmatrix} = \begin{bmatrix} c_1^{(1)} & c_1^{(2)} & \cdots & c_1^{(M)} \\ c_2^{(1)} & \cdots & & c_2^{(M)} \\ \cdots & \cdots & \cdots & \cdots \\ c_N^{(1)} & c_N^{(2)} & \cdots & c_N^{(M)} \end{bmatrix} \cdot \begin{bmatrix} h^{(1)} \\ h^{(2)} \\ \ldots \\ h^{(M)} \end{bmatrix} \quad (2)$$

where $h^{(i)}$ represents the channel coefficient of the channel from the i-th transmit antenna to the receive antenna. A generalization to more receive antennas is straightforward.

Figure 6:
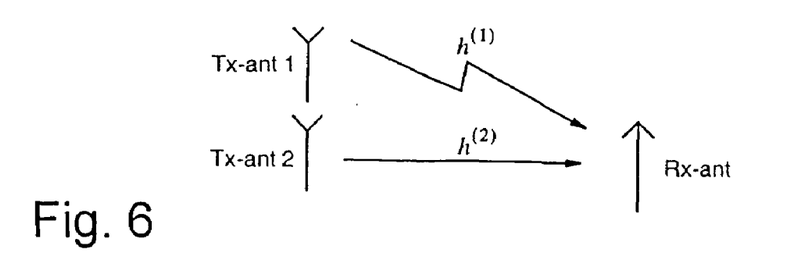
FIG. 6 shows a configuration of a transmit antenna diversity system.

In the following, examples of possible block code matrices for two and three transmitter antennas, respectively, are discussed in more detail. The configuration of a wireless communications system with two transmit antennas and one receive antenna is depicted in FIG. 6. The wireless communications system of FIG. 6 comprises two transmit channels, each transmit channel being characterized by a specific channel coefficient $h^{(i)}$ with i=1,2.

In the case of two transmit antennas depicted in FIG. 6 one possible block code matrix C with a code rate R=1 is:

$$c = \begin{bmatrix} X_1 & X_2 \\ -X_2^* & X_1^* \end{bmatrix} \quad (3)$$

For three transmit antennas one possible block code matrix C with a code rate R=0.5 is:

$$c = \begin{bmatrix} X_1 & X_2 & X_3 \\ -X_2 & X_1 & -X_4 \\ -X_3 & X_4 & X_1 \\ -X_4 & -X_3 & X_2 \\ X_1^* & X_2^* & X_3^* \\ -X_2^* & X_1^* & -X_4^* \\ -X_3^* & X_4^* & X_1^* \\ -X_4^* & -X_3^* & X_2^* \end{bmatrix} \quad (4)$$

The code rate R is defined as the ratio of the length K of the input vector X and the length N of each code word $C^{(i)}$:

$$R=K/N \quad (5)$$

As can be seen from FIG. 5, the block code encoder 24 outputs for each data signal in the form of a vector X a data block in the form of a code matrix C. The data block output by the block code encoder 24 is input into the multiplexer 26 which multiplexes the data words (vectors $C^{(i)}$) of each data block in accordance with an externally provided control signal in the frequency domain. The control signal is generated by the control unit 32.

In the multi carrier scheme OFDM, the output of the block code encoder 24 is modulated onto subcarriers which are orthogonal to each other. There exist essentially two possibilities to multiplex a data block comprising individual data words in an OFDM system. According to a first possibility depicted in FIG. 7, the data words of a specific data block could be extended in the time direction (STBC), i.e. multiplexed in the time domain. According to a second possibility, which his employed for the present invention, the data words of a data block are extended in the frequency direction as depicted in FIG. 8 (SFBC).

Figure 7:
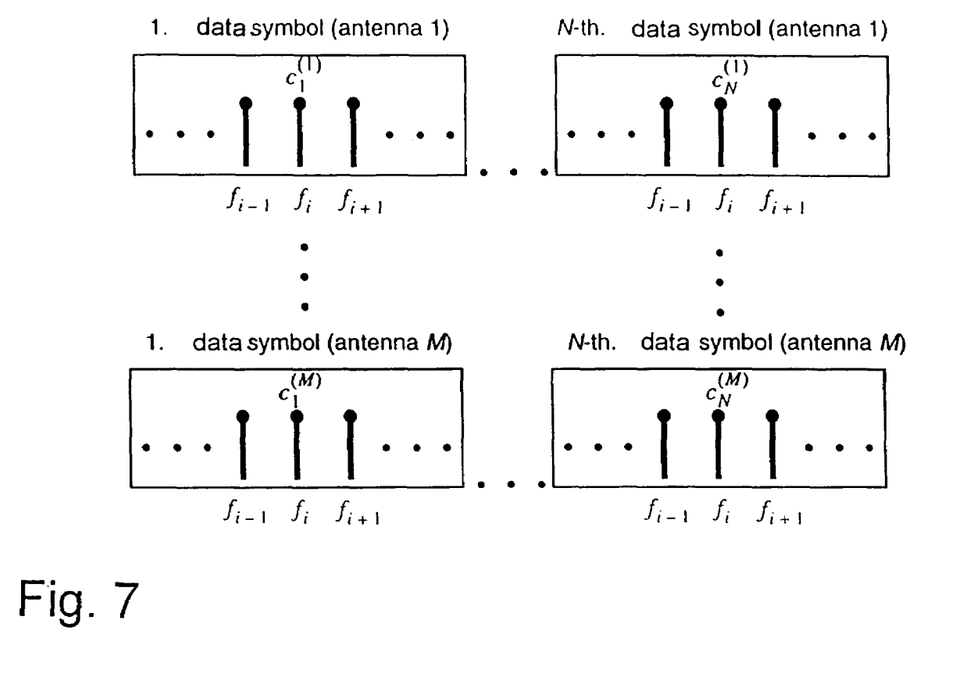
FIG. 7 is a schematic diagram of multiplexing data words in the time domain.
Figure 8:
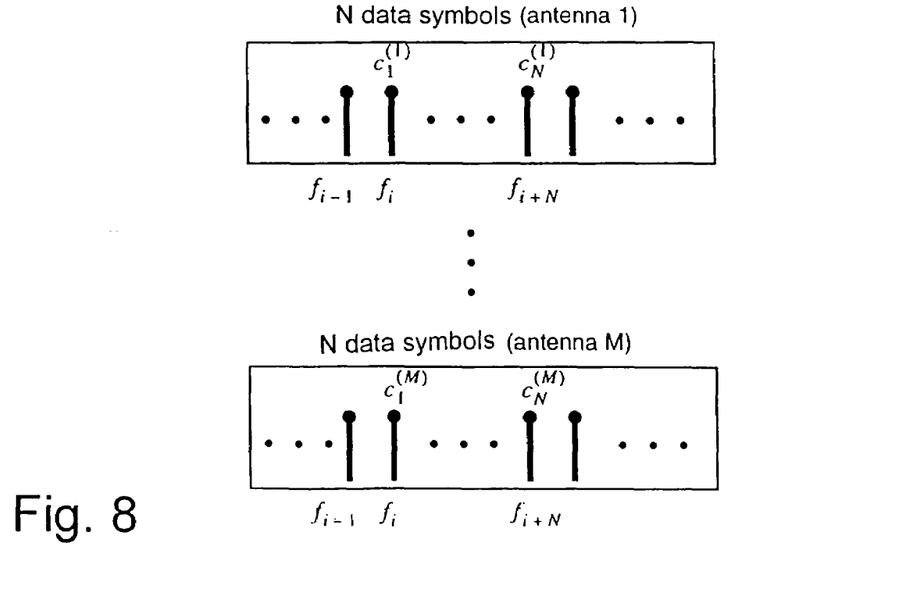
FIG. 8 is a schematic diagram of multiplexing data words in the frequency domain.

As can be seen from FIGS. 7 and 8, the individual data words of a data block are transmitted from different transmit antennas. According to the multiplexing scheme of FIG. 8, an individual data block is spread over N subcarriers and is transmitted during a time interval of T.

The encoded and multiplexed output signal of the encoder/multiplexer unit 28 is input into the radio transmitter 30. The radio transmitter 30 performs radio transmission over a plurality of transmit antennas by modulating a radio frequency carrier with the output signal of the encoder/multiplexer unit 28.

Figure 9:
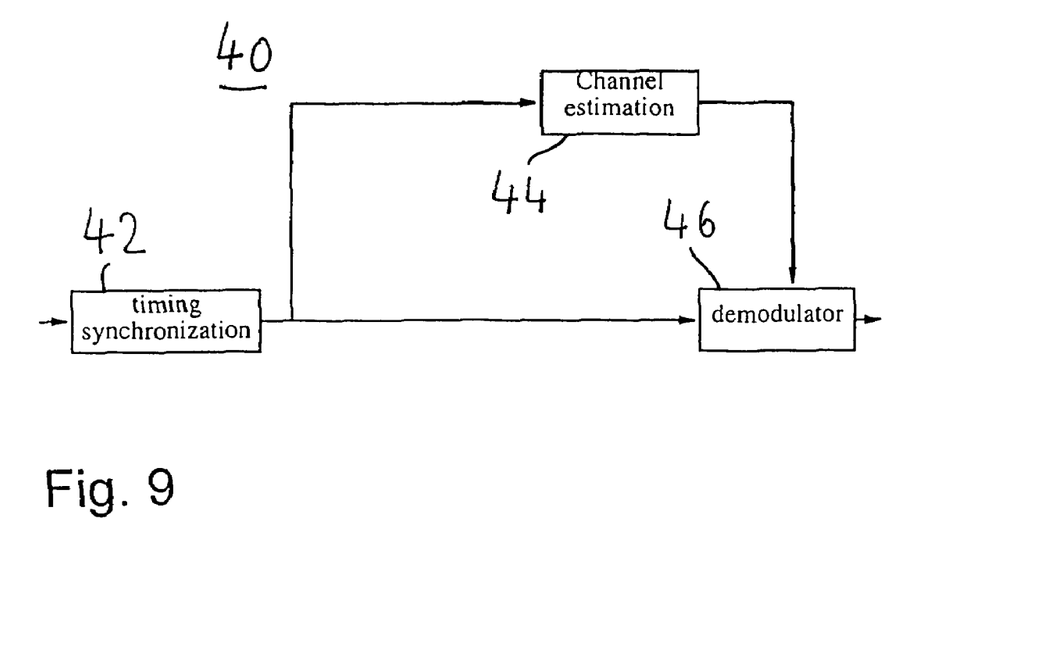
FIG. 9 is a schematic diagram of several components of a receiver stage of a transceiver for wireless communication.

The transceiver with the transmitter stage 10 of FIG. 3 further comprises a receiver stage not depicted in FIG. 3. The receiver stage has a physical layer with components for performing the inverse operations of the components depicted in FIG. 3. For example, the receiver stage comprises a descrambler, a FEC decoding unit, a demultiplexer/decoder unit with a demultiplexer and a block code decoder, etc. FIG. 9 shows some components of such a receiver stage 40.

As becomes apparent from FIG. 9, a receive signal vector Y received via a receive antenna not depicted in FIG. 9 is fed into a timing synchronization unit 42, which performs timing synchronization with the object to find an optimum timing instant minimizing intersymbol interference among the received data symbols. The output signal of the timing synchronization unit 42 is concurrently fed into a channel estimating unit 44 and a demodulator 46. The channel estimating unit 44 estimates the channel coefficients $h^{(i)}$ on the basis of the output signal of the timing synchronization unit 42. The channel coefficients estimated by the channel estimating unit 44 are then passed on to the demodulator 46 which performs demodulation of the receive signal using the estimated channel coefficients.

In the following, the operation of the channel estimating unit 44 is exemplarily described for the case that two transmit antennas and one receive antenna are utilized (FIG. 6). In this case encoding of the data signal can be performed on the basis of the above block code matrix (3) and the receive signal vector can be written as $Y=[Y_j \ Y_{j+1}]^T$. The index j denotes a specific frequency $f_j$.

On frequency $f_j$, $X_i$ is transmitted from the first transmit antenna and $X_{i+1}$ is transmitted from the second transmit antenna. On an adjacent frequency $f_{j+1}$, $-X^*_{i+1}$ is transmitted from the first transmit antenna and $X^*_i$ is transmitted from the second transmit antenna. The individual components $Y_j$ and $Y_{j+1}$ of the receive signal vector Y can thus be written as $$Y_j = X_i \cdot h^{(1)}(z_j) + X_{i+1} \cdot h^{(2)}(z_j) + n_j$$

$$Y_{j+1} = -X^*_{i+1} \cdot h^{(1)}(z_{j+1}) + X^*_i \cdot h^{(2)}(z_{j+1}) + n_{j+1} \qquad (6)$$

The variable $z_j$ denotes the transmit frequency $f_j$. Therefore, $h^{(i)}(z_j)$ is the coefficient of the channel between the transmit antenna $i=1,2$ and the receive antenna for a data symbol transmitted via frequency $f_j$ (SFBC). The term $n_j$ denotes the white gaussian noise at frequency $f_j$.

For the case that SFBC is applied ($z_j = f_j$) and the coherence bandwidth $B_c$ is relatively large, i.e. if relation (1) is fulfilled, the following assumptions are valid $$h^{(1)}(z_j) = h^{(1)}(z_{j+1}) = h^{(1)}$$

$$h^{(2)}(z_j) = h^{(2)}(z_{j+1}) = h^{(2)} \qquad (7)$$

This means that if the coherence bandwidth $B_c$ is relatively large equations (6) become $$Y_j = X_i \cdot h^{(1)} + X_{i+1} \cdot h^{(2)} + n_j$$

$$Y_{j+1} = -X^*_{i+1} \cdot h^{(1)} + X^*_i \cdot h^{(2)} + n_{j+1} \qquad (8)$$

Equations (8) can be written in terms of the receive signal vector Y and a data matrix Z, which is equivalent to the code matrix C, as $$Y = \begin{bmatrix} Y_j \\ Y_{j+1} \end{bmatrix} = \begin{bmatrix} X_i & X_{i+1} \\ -X^*_{i+1} & X^*_i \end{bmatrix} \cdot \begin{bmatrix} h^{(1)} \\ h^{(2)} \end{bmatrix} + \begin{bmatrix} n_j \\ n_{j+1} \end{bmatrix} = Z \cdot H + N \qquad (9)$$

In order to provide an estimate for the channel coefficients $h^{(1)}$ and $h^{(2)}$ the receive signal vector Y is multiplied with the Hermitian $Z^H$ of the known data matrix Z. The content of the data matrix Z corresponds to a standardized preamble portion which is known to the transceiver. The multiplication of $Z^H$ and Y yields $$Z^H \cdot Y = Z^H \cdot Z \cdot H + Z^H \cdot N = \hat{H} \qquad (10)$$

Since Z is a scaled unitary matrix, i.e.

$$z^{-1} = \frac{1}{\det(Z)} z^H, \qquad (11)$$

the channel coefficients in equation (10) are separated. The estimated channel coefficients comprised within $\hat{H}$ are passed from the channel estimating circuit 44 to the demodulator 46.

It has been found that the estimated channel coefficients thus obtained deviate from the actual channel coefficients. One reason therefor is the fact that after timing synchronization a phase ramp in the frequency domain is present in the receive signal Y to be processed by the channel estimating unit 44 and the demodulator 46. The origins and the influence of the phase ramp present in the receive signal Y after timing synchronization will now be described in more detail.

It has been mentioned above that the timing synchronization unit 42 performs timing synchronization with the object of minimizing intersymbol interference. In many cases there are multiple optimum timing instants where no intersymbol interference occurs. For example, this applies if the cyclic prefix of an OFDM symbol is longer than the channel impulse response. In this situation of multiple timing instants, which are all optimum with respect to minimizing intersymbol interference, the actual timing position is chosen dependent only on the currently involved noise samples.

Figure 10:
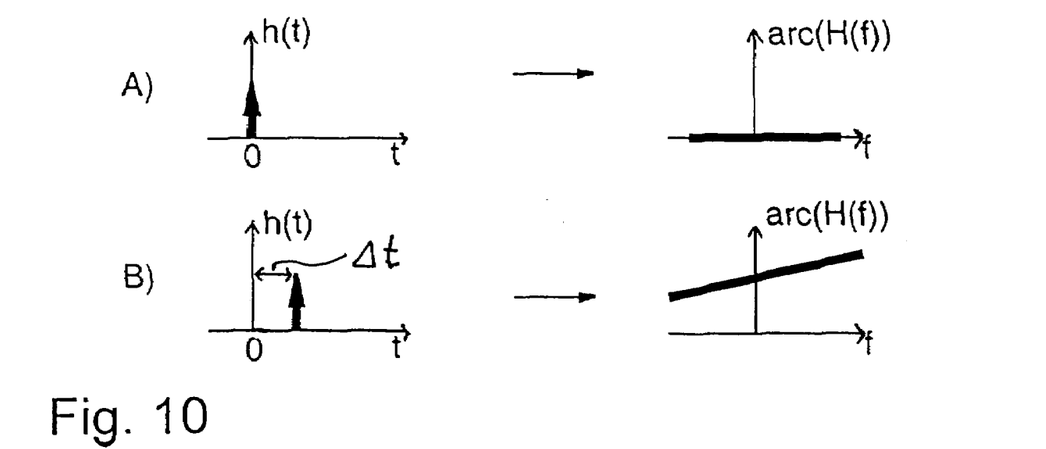
FIG. 10A, 10B show the introduction of a delay into a receive signal during timing synchronization.

In FIGS. 10A and 10B the phase of the channel transfer function H(f) of a one tap channel for different timing positions minimizing the intersymbol interference is shown. The position "0" in the time domain refers to the timing synchronization at the receiver stage 40 relative to a FFT window of the receiver stage 40.

As becomes apparent from FIG. 10A, there is no phase ramp comprised in the phase arc(H(f)) of the channel transfer function H(f) when the one tap is at timing position "0". Regarding OFDM, however, it is very likely that the obtained timing synchronization introduces a delay $\Delta t$ relative to the FFT window of the receiver stage 40. This situation is depicted in FIG. 10B. The reason for this delay $\Delta t$ is not the processing time of the timing synchronization unit 42, but the fact that the optimum timing instant is chosen such that the intersymbol interference is minimized. The delay $\Delta t$ can therefore also be referred to as a systematic delay. The consequence of the delay $\Delta t$ introduced during timing synchronization is a systematic phase ramp, i.e. a non-flat phase of channel transfer function H(f). This phase ramp is depicted in FIG. 10B on the right.

The phase ramp comprised within the receive signal may not only be caused by timing synchronization, but also by the transmit channel or by receive and transmit filters. If the phase ramp is already present in the receive signal prior to timing synchronization, the phase ramp will usually decrease as a result of timing synchronization. This applies even if timing synchronization is performed with the object of minimizing intersymbol interference. Nevertheless, the probability that there will be no phase ramp in the receive signal after timing synchronization is comparatively low.

Since the channel coefficients are estimated based on a receive signal comprising a phase ramp, the phase ramp will also be present in the estimated channel coefficients. The phase ramp contained in the channel coefficients leads to an increasing interference during the channel estimation when SFBC is applied, i.e. if the data words are multiplexed in the frequency domain. The reason for this increasing interference is the fact that equation (7) will generally not be fulfilled even if relation (1) holds, i.e. even if the coherence bandwidth $B_c$ is relatively large.

Since one reason for the phase ramp is the fact that timing synchronization is performed based on other criteria than minimizing the phase ramp, one could think about implementing timing synchronization with the object of minimizing the phase ramp instead of minimizing the intersymbol interference. In this case the channel estimation will be improved. However, a drawback of this solution would be the fact that the overall performance of the receiver stage 40 will decrease since intersymbol interference will no longer be minimized.

Figure 11:
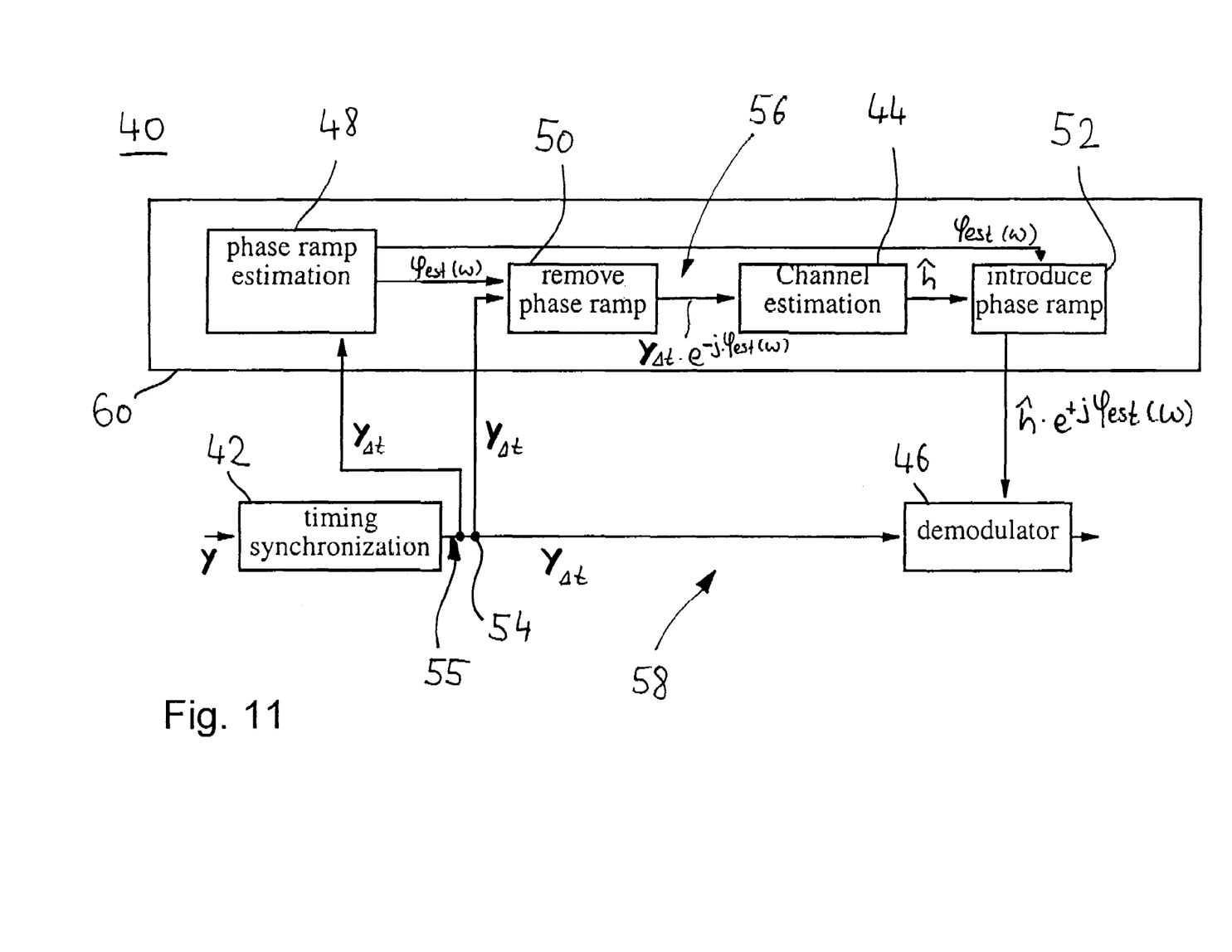
FIG. 11 is a schematic diagram of a receiver stage comprising a first embodiment of an estimating stage according to the invention.

In order to both minimize intersymbol interference and improve channel estimation, the receiver stage 40 depicted in FIG. 11 is proposed. The improved receiver stage 40 comprises an estimating stage 60 according to a first example embodiment with a phase ramp estimation unit 48, a phase ramp removal unit 50, a channel estimating unit 44, and a phase ramp introduction unit 52. In a signal path behind the timing synchronization unit 42 a node 54 is arranged for splitting a common signal path 55 into a channel estimating branch 56 and a demodulation branch 58. As can be seen from FIG. 11, the channel estimating unit 44 is arranged in the channel estimating branch 56.

The function of the estimating stage 60 depicted in FIG. 11 will now be described exemplarily for the frequency domain. The individual steps performed by the estimating stage 60 could also be performed in the time domain.

As has been explained above, the transmit channel, a receive or a transmit filter, or the timing synchronization unit 42 may introduce a phase ramp $\phi(\omega)$ in the frequency domain or a delay $\Delta t$ in the time domain into a receive signal Y. The receive signal $Y_{\Delta t}$ including this phase ramp $\phi(\omega)$ is input from the timing synchronization unit 42 into the phase ramp estimation unit 48 of the estimating stage 60. The phase ramp estimating unit 48 determines by way of linear regression the phase ramp $\phi(\omega)$ introduced into the receive signal.

The estimated phase ramp $\omega_{est}(\omega)$ is input into the phase ramp removal unit 50 which his arranged in the channel estimation branch 56. The phase ramp removal unit 50 also receives the receive signal $Y_{\Delta t}$, which comprises the phase ramp $\phi(\omega)$, from the timing synchronization unit 42 and processes this receive signal $Y_{\Delta t}$ to remove the phase ramp $\phi(\omega)$ comprised therein. This is done by multiplying the receive signal $Y_{\Delta t}$ with a factor $e^{-j\Phi_{est}(\omega)}$.

The phase ramp removal could also be performed in the time domain, i.e. the delay $\Delta t$ corresponding to the phase ramp $\phi$ could be compensated. In this case the delay compensation is equal to a cyclic shift of the samples of each OFDM symbol to which the correction should be applied.

The receive signal $Y_{\Delta t} \cdot e^{-j\Phi_{est}(\omega)}$ processed by the phase ramp removal unit 50 is input into the channel estimating circuit 44. The channel estimating unit 44 estimates the channel coefficients $h^{(i)}$ as previously explained with respect to equations (6) to (11).

The estimated channel coefficients $h^{(i)}$ output by the channel estimating unit 44 are input into the phase ramp introduction unit 52 which further receives the phase ramp $\phi_{est}(\omega)$ from the phase ramp estimating unit 48. The phase ramp introduction unit 52 introduces the removed estimated phase ramp $\phi_{est}(\omega)$ again by multiplying the estimated channel coefficients $h^{(i)}$ with $e^{j\Phi_{est}(\omega)}$. The channel coefficients $h \cdot e^{j\Phi_{est}(\omega)}$ output by the phase ramp introduction unit 52 are input to the demodulator 46 where demodulation of the receive signal $Y_{\Delta t}$ is performed utilizing the channel coefficients.

Figure 12:
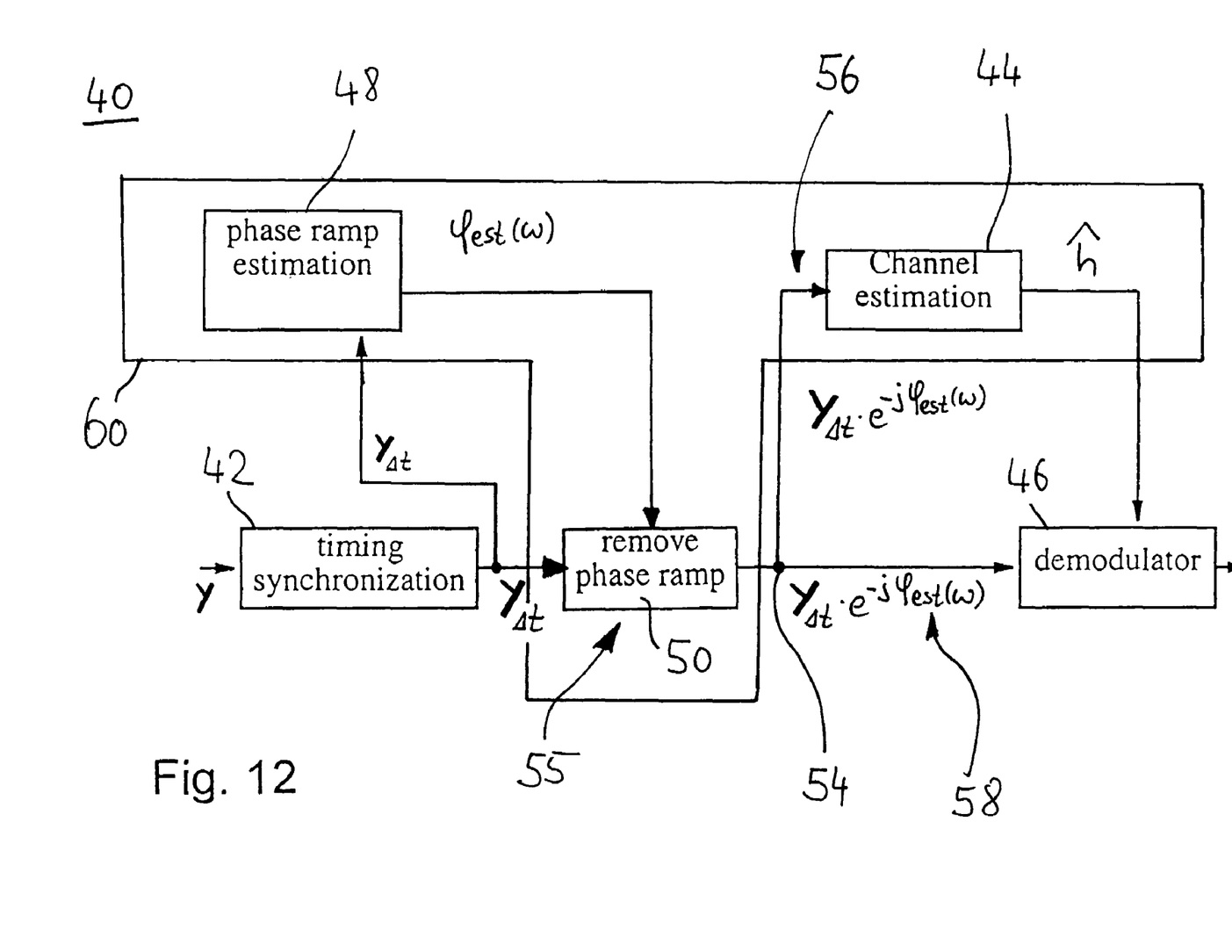
FIG. 12 is a schematic diagram of a receiver stage comprising a second embodiment of an estimating stage according to the invention.

In FIG. 12, a receiver stage 40 comprising an estimating stage 60 according to a second example embodiment is shown. The estimating stage 60 comprises a phase ramp estimation unit 48, a phase ramp removal unit 50 and a channel estimating unit 44. The phase ramp removal unit 50 is arranged in a common signal path 55 behind a timing synchronization unit 52 and prior to a node 54. The node 54 serves for splitting the common signal path 55 into a channel estimating branch 56 and a demodulation branch 58.

The function of the estimating stage 60 depicted in FIG. 12 will now be described exemplarily for the frequency domain. The individual steps performed by the estimating stage 60 could also be performed in the time domain.

The receive signal $Y_{\Delta t}$ including a phase ramp $\phi(\omega)$ is input from the time synchronization unit 42 into the phase ramp estimation unit 48 of the estimating stage 60. The phase ramp estimating unit 48 determines by way of linear regression the phase ramp $\phi(\omega)$ introduced into the receive signal Y. The estimated phase ramp $\phi_{est}(\omega)$ is then input into the phase ramp removal unit 50 which is arranged in the common signal path 55. The phase ramp removal unit 50 also receives the receive signal $Y_{66 \ t}$, which comprises the phase ramp $\phi(\omega)$, from the timing synchronization unit 42 and processes this receive signal $Y_{\Delta t}$ to remove the phase ramp $\phi(\omega)$ comprised therein. This is done in a similar way like in the first embodiment by multiplying the receive signal $Y_{\Delta t}$ with a factor $e^{-j\Phi_{est}(\omega)}$.

The receive signal $Y_{\Delta t} \cdot e^{-j\Phi_{est}(\omega)}$ processed by the phase ramp removal unit 50 is split at a node 54 and fed both into the channel estimation branch 56 and the demodulation branch 58. In the channel estimation branch 56 the channel estimating unit 44 determines estimated channel coefficients $h^{(i)}$ which are input into the demodulator 46. The demodulator 46 performers demodulation of the processed receive signal $Y_{\Delta t} \cdot e^{-j\Phi_{est}(\omega)}$ utilizing the estimated channel coefficients $h^{(i)}$. Since both channel estimation and demodulation are performed on the basis of the processed receive signal $Y_{\Delta t} \cdot e^{-j\Phi_{est}(\omega)}$, the phase ramp introduction unit of the first embodiment depicted in FIG. 11 can be omitted.

The embodiment depicted in FIG. 11, according to which removal of the phase ramp takes place in the channel estimation branch, can be employed if a transmit diversity scheme is utilized which multiplexes a preamble portion of a data signal in the frequency domain (e.g. by means of SFBC) and a user data portion of the data signal in the time domain (e.g. by means of STBC). If however, both the preamble portion and the user data portion are multiplexed in the frequency domain, the phase ramp problem outlined above concerns the user data portion also. In this case the embodiment depicted in FIG. 12 can be employed.

The technology described above can be extended to transmit diversity systems comprising more than two transmit antennas. Another example embodiment is based on a transmit diversity system comprising three transmit antennas and operating in accordance with a block-coding scheme using the code matrix shown in equation (4).

The invention claimed is:

1. A method of estimating channel coefficients in a multi carrier system operating in accordance with a block-code based transmit diversity scheme, in which a data content of a code matrix is multiplexed in a frequency domain, comprising:

a) determining a phase ramp in the frequency domain or an equivalent thereof in the time domain, the phase ramp or the equivalent thereof being comprised within a receive signal after timing synchronization;

b) processing the receive signal to remove the phase ramp or the equivalent thereof; and c) estimating the channel coefficients on the basis of the processed receive signal.

2. The method of claim 1, wherein the phase ramp or the equivalent thereof is determined by way of estimation.

3. The method of claim 2, wherein the estimation is performed by linear regression.

4. The method of claim 1, further comprising the step of performing timing synchronization with the object of minimizing intersymbol interference.

5. The method of claim 1, wherein at least one of steps a) and b) is performed in the frequency domain.

6. The method of claim 1, wherein at least one of steps a) and b) is performed in a time domain.

7. The method of claim 1, wherein after timing synchronization the receive signal is split and fed into a channel estimation branch on the one hand and a demodulation branch on the other hand, and wherein the phase ramp or the equivalent thereof is removed in the channel estimation branch.

8. The method of claim 1, wherein after timing synchronization the receive signal is split and fed into a channel estimation branch on the one hand and a demodulation branch on the other hand, and wherein the phase ramp or the equivalent thereof is removed prior to splitting of the receive signal.

9. The method of claim 1, further comprising introducing the phase ramp or the equivalent thereof into the estimated channel coefficients.

10. The method of claim 1, further comprising demodulating the receive signal utilizing the estimated channel coefficients.

11. The method of claim 1, wherein the block-code based transmit diversity scheme of space-frequency block coding or of permutation in the frequency domain is employed.

12. A computer program product comprising program code portions stored on a computer readable recording medium for performing the steps of claim 1 when the program code is run on a computer.

13. Apparatus for estimating channel coefficients in a multi carrier system operating in accordance with a block-code based transmit diversity scheme in which a data content of a code matrix is multiplexed in a frequency domain, comprising:

a) a unit for determining a phase ramp in the frequency domain or an equivalent thereof in the time domain, the phase ramp or the equivalent thereof being comprised within a receive signal after timing synchronization;

b) a unit for processing the receive signal to remove the phase ramp or the equivalent thereof; and c) a unit for estimating the channel coefficients on the basis of the processed receive signal.

14. The apparatus according to claim 13, further comprising a node for splitting a signal path after timing synchronization into a channel estimation branch on the one hand and a demodulation branch on the other hand, and wherein the unit for processing the receive signal is arranged in the channel estimation branch.

15. The apparatus according to claim 13, further comprising a node for splitting a signal path after timing synchronization into a channel estimation branch on the one hand and a demodulation branch on the other hand, and wherein the unit for processing the receive signal is arranged in the signal path prior to the node.

16. The estimating stage according to claim 13, further comprising a unit for introducing the phase ramp or the equivalent thereof into the estimated channel coefficients.

17. A transceiver of a wireless communication system comprising a receiver stage with an estimating stage according to claim 13.

18. An estimating stage for estimating channel coefficients in a multi carrier system operating in accordance with a block-code based transmit diversity scheme in which a data content of a code matrix is multiplexed in a frequency domain, comprising:

a) means for determining a phase ramp in the frequency domain or an equivalent thereof in the time domain, the phase ramp or the equivalent thereof being comprised within a receive signal after timing synchronization;

b) means for processing the receive signal to remove the phase ramp or the equivalent thereof; and c) means for estimating the channel coefficients on the basis of the processed receive signal.

19. The estimating stage according to claim 18, further comprising a node for splitting a signal path after timing synchronization into a channel estimation branch on the one hand and a demodulation branch on the other hand, and wherein the means for processing the receive signal is arranged in the channel estimation branch.

20. The estimating stage according to claim 18, further comprising a node for splitting a signal path after timing synchronization into a channel estimation branch on the one hand and a demodulation branch on the other hand, and wherein the means for processing the receive signal is arranged in the signal path prior to the node.

21. The estimating stage according to claim 18, further comprising a means for introducing the phase ramp or the equivalent thereof into the estimated channel coefficients.

22. A transceiver of a wireless communication system comprising a receiver stage with an estimating stage according to claim 18.

* * * * *

UNITED STATES PATENT AND TRADEMARK OFFICE
CERTIFICATE OF CORRECTION

PATENT NO. : 7,324,600 B2
APPLICATION NO. : 10/774702
DATED : January 29, 2008
INVENTOR(S) : Pauli et al.

It is certified that error appears in the above-identified patent and that said Letters Patent is hereby corrected as shown below:

In Column 11, Line 41, delete "$\omega_{est}(\omega)$" and insert -- $\varphi_{est}(\omega)$ --, therefor.

In Column 11, Line 60, delete " $h^{(i)}$ " and insert -- $\hat{h}^{(i)}$ --, therefor.

In Column 12, Line 25, delete "$Y_{66\,t}$," and insert -- $Y_{\Delta t}$, --, therefor.

Signed and Sealed this

Tenth Day of March, 2009

JOHN DOLL
*Acting Director of the United States Patent and Trademark Office*